3,482,110
DEVICE FOR AUTOMATICALLY RENDERING APPARATUS INOPERATIVE WHEN SUBJECTED TO SHOCK
William Lovell Robinson, Northolt, England, assignor to Electric Shop Developments Limited, London, England, a British company
Filed Feb. 28, 1968, Ser. No. 709,009
Claims priority, application Great Britain, Feb. 28, 1967, 9,536/67
Int. Cl. H01h 35/14
U.S. Cl. 307—120          3 Claims

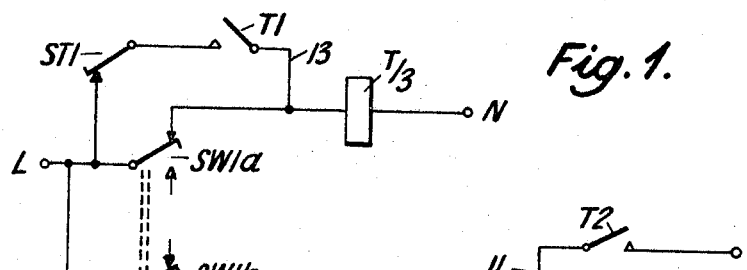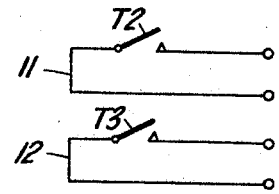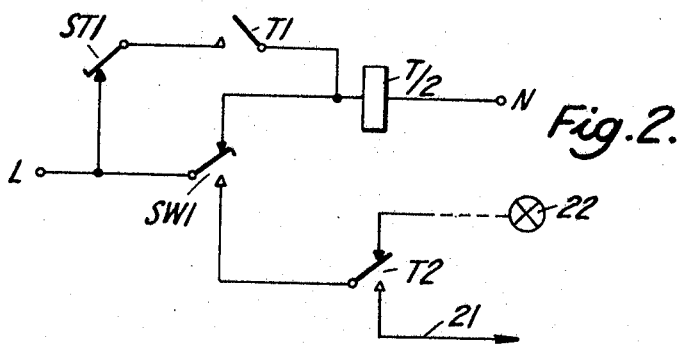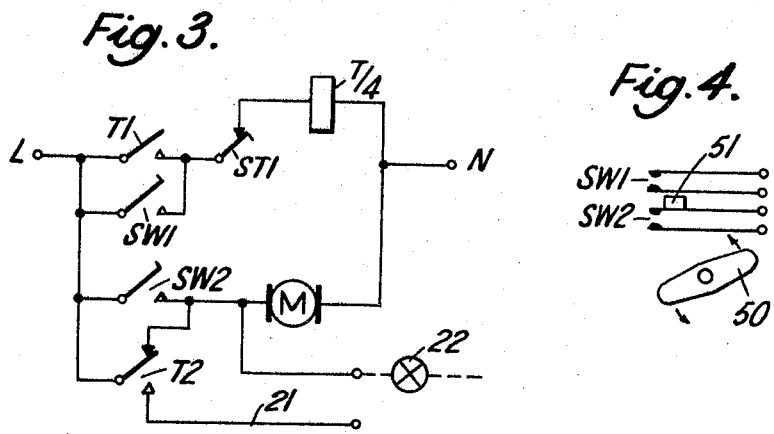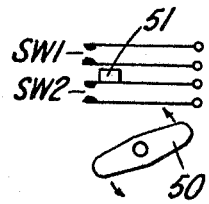
INVENTOR
WILLIAM LOVELL ROBINSON
BY
*Bacon & Thomas*
ATTORNEYS United States Patent Office 3,482,110
Patented Dec. 2, 1969

ABSTRACT OF THE DISCLOSURE

Devices for automatically rendering apparatus (e.g. a dispensing machine) inoperative when the apparatus is hit or otherwise subjected to shock, the devices including for instance an inertia operable switch. The devices have a switch which must be successively switched to two positions before the apparatus can again be operated. This switch may be manually operable or the devices may include a time delay means (e.g. an electric motor and cam operable switches) for automatically rendering the apparatus operative again after the apparatus has been inoperative for a while.

---

The invention relates to controls for apparatus more particularly to devices for automatically rendering dispensing apparatus such as change giving, vending or amusement machines inoperative when the apparatus is rocked, tilted or otherwise subjected to shock.

The invention provides in one of its aspects, a device for automatically rendering apparatus inoperative when the apparatus is rocked, tilted, hit or otherwise subjected to shock which device comprises an electrical control for connection to an apparatus to render the apparatus either operative or inoperative, a switch which may be switched to at least two different operating conditions, which switch is connected to the control so that when the said switch is switched to one of its conditions it operates the control to render the apparatus operative, the control being arranged to continue to render the apparatus operative when the said switch is subsequently switched to another of its conditions, and means arranged to be automatically operated when the apparatus is rocked, tilted, hit or otherwise subjected to shock to operate the control, provided that the said switch is in a condition other than the said one of its conditions, to render the apparatus inoperative if it is not already inoperative.

Preferably the control includes a relay having at least one relay operated switch which may be connected in a supply circuit of an electrically operated apparatus, and preferably the said switch is also for connection in the supply circuit of an electrically operated apparatus so that the apparatus is rendered operative when the said switch is in one of the said other of its conditions and the relay operated switch is closed.

The control may include a solenoid having a solenoid operated plunger which may be arranged so that its position renders a mechanically operated apparatus either operative or inoperative.

Preferably the control is provided with a holding circuit whereby the control continues to render the apparatus operative after the said switch has been switched from the said one condition to one of the said other of its conditions and the said means is connected in the holding circuit.

Preferably the said means is an inertia operable switch. The said switch may be manually operable.

Alternatively the said switch may be operable by the control so that when the control operates to render an apparatus inoperative and operative the said switch is switched to the said one of its positions and one of said other of its positions respectively and the control may include a time delay means which is connected to be operated by the said switch when it is switched to the said one of its positions and when operated, after a time delay, to operate the control to render the apparatus operative again, whereby the device may be used for automatically rendering an apparatus inoperative for a predetermined interval after the apparatus has been subjected to shock.

Preferably the time delay means comprises an electric motor, the said switch being connected in the supply circuit of the motor to start the motor when switched to the said one of its positions, at least one cam to be driven by the motor, a first cam operable switch to operate the control to render the apparatus operative a time delay after the motor starts and a second cam operable switch in the supply circuit for stopping the motor after the first cam operable switch has been operated.

Embodiments of the invention will now be described by way of example with reference to the accompanying drawings in which:

FIGURES 1 and 2 are circuit diagrams of two devices for automatically rendering electrically operated apparatus inoperative when the apparatus is rocked, tilted, hit or otherwise subjected to shock, FIGURE 3 is a circuit diagram of a device for automatically rendering electrically operated apparatus inoperative for a predetermined interval when the apparatus is rocked, tilted, hit or otherwise subjected to shock, and FIGURE 4 is a diagrammatic view of part of the device shown in FIGURE 3.

The device shown in FIGURE 1, for automatically rendering electrically operated apparatus (e.g. fruit machines) inoperative when the apparatus is rocked, tilted, hit or otherwise subjected to shock, comprises a control relay T/3 having three relay operable switches T1, T2, and T3, an inertia operable switch ST1 which automatically operates when rocked, tilted, hit or otherwise subjected to shock, and a manually operable two position switch SW1 having two movable contacts SW1a and SW1b ganged together. In one operating condition of the switch SW1 the contacts SW1a complete a supply circuit from the mains supply terminals L and N to the relay T/3 and in the other operating condition of the switch SW1 the contacts SW1b complete a circuit from the main supply terminal L to the primary circuit of a transformer (not shown), which has three secondary circuits of which two are shown namely a 50 volt circuit 11 and a 115 volt circuit 12. The third secondary circuit (not shown) is a 6 volt circuit. The voltage outputs from the secondary circuits are of suitable values for operating dispensing apparatus (e.g. fruit machines) the 6 volt supply being for powering lamps, the 115 volts supply being for powering the dispensing part of the apparatus and the 50 volt supply being for operating motors and relays in the apparatus. The relay operated switches T2 and T3 are connected in the secondary circuits 11 and 12 respectively. The relay operated switch T1 is in series with the switch ST1 in a holding circuit 13 for the relay T/3.

To initially render the apparatus operative the switch SW1 is switched to complete the supply circuit to the relay T/3 which thereupon closes the switches T1, T2 and T3. The switch ST1 will normally be closed so that the closing of the switch T1 will complete the holding circuit 13 to the relay T/3. The switches T2 and T3 complete the secondary circuits 11 and 12 respectively. The switch SW1 is then switched to the other of its two positions to supply current to the primary circuit of the transformer so that power will be supplied from the secondary circuits to render the apparatus operative.

If the apparatus is rocked, tilted, hit or otherwise subjected to shock the inertia switch ST1 is opened so that the holding circuit 13 to the relay T/3 is broken and the switches T1, T2 and T3 are set to their open condition. Even if the switch ST1 is only momentarily opened the opening of the switch T1 ensures that the holding circuit 13 to the relay T/3 remains broken.

Before the apparatus can be operated again the switch SW1 must be operated successively to energise the relay T/3 and to complete the primary circuit to the transformer.

The secondary circuit (not shown) for the 6 volt supply does not have a switch operable by the relay T/3 because it is not necessary to cut off the power to relatively unimportant items such as lights when the apparatus is abused.

The construction and operation of the device shown in FIGURE 2 is similar to that of FIGURE 1 except in that the two position switch SW1 has only one movable contact, except in that there is no transformer in the supply circuit 21, the circuit 21 being directly connectible to the switch SW1 by the switch T2 which is operable by the relay T/2, and except in that a lamp 22 is provided. The lamp 22 is connected to the switch T2 to be operated to indicate when the apparatus has been rocked, tilted, hit or otherwise subjected to shock when the relay T/2 is deenergised by the switch ST1, the switch SW1 being normally in the position other than that shown in FIGURE 2.

It will be appreciated that with fruit machines and other dispensing apparatus it is desirable that each of the devices shown in FIGURES 1 and 2 cannot be tampered with so the device used is connected to the apparatus so that only the switch SW1 can be operated without opening up the apparatus.

It will be noted that after the relay (T/3 or T/2) has been de-energised the switch SW1 has to be moved successively to both its positions to render the apparatus operative again. This prevents the apparatus from being rocked, etc. resulting in parts of the apparatus being operated (e.g. relays being made to lock in) while at the same time the switch SW1 is held in a position to prevent the inertia operable switch from rendering the apparatus inoperative, i.e. the switch SW1 cannot simultaneously be in one position to energise the relay (T/3 or T/2) and in its other position to allow power to be supplied to the apparatus.

The devices shown in FIGURES 1 and 2 do not necessarily have to be used with electrically operated apparatus. If a self contained power supply is made available for the inertia operable switch ST1 and the relay (T/3 or T/2) is replaced by a solenoid fitted with a contact for closing a holding circuit, a solenoid operated plunger may be used to mechanically render an apparatus inoperative when the solenoid is de-energised by operation of the switch ST1.

The device shown in FIGURES 3 and 4 is for automatically rendering apparatus inoperative for a predetermined interval when the apparatus is rocked, tilted, hit or otherwise subjected to shock.

The operation of the device is similar to that of the devices shown in FIGURES 1 and 2 and accordingly the device and its operation will be described only in so far as there are differences between it and those devices. The main difference is that a relay operable switch T2 is provided instead of a manually operable switch. The relay operable switch T2 and another relay operable switch T1 are both controlled by the control relay T/4. When the relay T/4 is energised the switch T1 will be closed to provide a holding circuit for the relay and the switch T2 will be moved to its position other than that shown in FIGURE 3 so that the mains supply terminal L is connected to the supply circuit 21 of whatever apparatus the device is to be used with, i.e. that apparatus is operative.

When the device is subjected to shock the inertia operable switch ST1 operates to open the holding circuit of the relay T/4, whereupon switch T1 opens to keep the relay T/4 de-energised and the switch T2 switches to its position shown in FIGURE 3, and renders the apparatus with which the device is being used inoperative.

The switch T2 then completes the supply circuit of a time delay device in the form of an electric motor M whereupon the motor starts. Referring to FIGURE 4 the motor rotates a cam 50. As the cam 50 rotates one or other end of the cam will after a while reach the cam operable switches SW1 and SW2. The cam will first close the switch SW2 which is in parallel with the switch T2 in the supply circuit of the motor. After a further short interval as the cam 50 rotates an abutment 51 on one of the contacts of the switch SW2 will close the switch SW1 which is in parallel with the switch T1 in the holding circuit of the relay T/4. The closing of the switch SW1 energises the relay T/4 so that the switch T1 is closed and the switch T2 operated to render the apparatus with which the device is being used operative, i.e. the device having rendered the apparatus inoperative renders the apparatus operative again after a predetermined interval the duration of which depends on how long it is before the cam 50 closes the switch SW1.

As the cam 50 continues to rotate the switch SW1 is opened and then the switch SW2 is opened whereupon the motor M stops. It will be noted that when the motor is energised the cam has to rotate almost through 180° before its other end reaches the switches SW1 and SW2.

The lamp 22 is energised when the motor is energised to indicate when the apparatus is inoperative.

The invention is not limited to the details of the foregoing embodiments.

For example the present apparatus may be used in conjunction with apparatus described in co-pending applications U.S. Ser. No. 709,063, filed Feb. 28, 1968 relating to a Control Equipment for a Phonographic Fruit Machine and U.S. Ser. No. 708,969, filed Feb. 28, 1968, relating to a Hopper Modification for a Phonographic Fruit Machine, both by the present inventor.

I claim:

1. A circuit for automatically rendering a secondary circuit inoperative when the apparatus is rocked, tilted, hit or otherwise subjected to shock, which device comprises power supply means, a relay having an actuating coil, a holding contact means and a further contact means, a first switch having first and second operating conditions, and said first switch in said first operating position coupling said actuating coil to said power supply means and the second operating condition being operative to energize said secondary circuit, an inertia operable switch in series with said holding contact means of said relay, at least one of said inertia operable switch and said holding contact being in shunt with the first switch and said further contact being disposed in said secondary circuit.

2. A circuit as set forth in claim 1 in which said further contact means is in series with said first switches when said first switch is in said second operating condition, 3. A circuit as set forth in claim 1, further comprising a motor, circuit means coupling said motor to said power supply means through switch means operable to couple power to said motor on deenergization of said relay, a further switch means operative to couple said secondary circuit for energization by said power supply, said motor being coupled to operate said further switch means after a period of time.

References Cited

UNITED STATES PATENTS

| | | |
|---|---|---|
| 2,053,379 | 9/1936 | S. Hyvers et al. |
| 2,103,744 | 12/1937 | Dumble. |
| 2,544,945 | 3/1951 | Williams. |
| 2,893,531 | 7/1959 | Hebel _____ 194—97 |
| 3,350,581 | 10/1967 | Stein _____ 307—117 |

ROBERT K. SCHAEFER, Primary Examiner

T. B. JOIKE, Assistant Examiner

U.S. Cl. X.R.

194—97